US010922303B1

(12) United States Patent
Bruck et al.

(10) Patent No.: US 10,922,303 B1
(45) Date of Patent: Feb. 16, 2021

(54) EARLY DETECTION OF CORRUPT DATA PARTITION EXPORTS

(71) Applicant: Amazon Technologies, Inc., Seattle, WA (US)

(72) Inventors: Lewis Bruck, Bothell, WA (US); Pejus Manoj Das, Shoreline, WA (US); Dumanshu Goyal, Seattle, WA (US); Chase Kernan, Seattle, WA (US); Akshat Vig, Shoreline, WA (US)

(73) Assignee: Amazon Technologies, Inc., Seattle, WA (US)

(*) Notice: Subject to any disclaimer, the term of this patent is extended or adjusted under 35 U.S.C. 154(b) by 568 days.

(21) Appl. No.: 15/680,128

(22) Filed: Aug. 17, 2017

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC ............ G06F 11/1451; G06F 2201/84; G06F 16/2365; G06F 11/1464; G06F 3/0619; G06F 11/0793; G06F 2201/80; G06F 3/065; G06F 3/0689; G06F 2221/034; G06F 11/2058; G06F 11/0751; G06F 11/2025; G06F 21/56; G06F 11/1469; G06F 11/1076
USPC ........... 707/600–831, 899, 999.001–999.206
See application file for complete search history.

(56) References Cited

U.S. PATENT DOCUMENTS

| | | | | |
|---|---|---|---|---|
| 7,647,329 B1* | 1/2010 | Fischman | ............ | G06F 3/0607 707/999.1 |
| 7,934,131 B1* | 4/2011 | Pinheiro | ............ | G06F 11/0709 709/224 |
| 8,074,014 B2* | 12/2011 | Narayanan | ............ | G06F 1/3268 711/112 |
| 8,224,804 B2* | 7/2012 | Unnikrishnan | ....... | G06F 16/951 707/711 |
| 8,443,077 B1* | 5/2013 | Lappas | ................. | G06F 3/0619 709/224 |
| 8,930,312 B1 | 1/2015 | Rath et al. | | |
| 8,949,188 B2* | 2/2015 | Pafumi | ............... | G06F 11/1415 707/640 |
| 9,632,878 B1 | 4/2017 | Maccanti et al. | | |
| 9,633,051 B1 | 4/2017 | Maccanti et al. | | |
| 2003/0105829 A1* | 6/2003 | Hayward | ............ | H04L 67/2852 709/214 |
| 2004/0044707 A1* | 3/2004 | Richard | ............. | G06F 11/1458 |

(Continued)

*Primary Examiner* — Angelica Ruiz
(74) *Attorney, Agent, or Firm* — Robert C. Kowert; Kowert, Hood, Munyon, Rankin & Goetzel, P.C.

(57) ABSTRACT

A system that implements a data storage system may store data for a database table in multiple replicated partitions on respective storage nodes. An export of an active database partition may generate an exported copy of the database partition. A first exported copy may be stored locally on a source node and a second exported copy of the database partition may be sent to a recipient node. The source node may validate the first copy responsive to sending the second copy and may perform the validation while the second copy is being sent and processed at the recipient node. If the first copy cannot be validated, the source node may cause the second copy to be invalidated and abort further processing of the second copy. The source node may also cause the second copy to be marked as invalid to prevent reliance on an invalid database partition copy.

20 Claims, 8 Drawing Sheets

(56) References Cited

U.S. PATENT DOCUMENTS

| | | | |
|---|---|---|---|
| 2004/0117438 A1* | 6/2004 | Considine | H04L 67/1097 709/203 |
| 2005/0010869 A1 | 1/2005 | Truelove et al. | |
| 2007/0156842 A1* | 7/2007 | Vermeulen | H04L 67/1097 709/217 |
| 2007/0217763 A1* | 9/2007 | Siemens | G08B 13/19667 386/226 |
| 2009/0313503 A1* | 12/2009 | Atluri | G06F 11/1453 714/19 |
| 2011/0078666 A1* | 3/2011 | Altekar | G06F 11/3636 717/131 |
| 2013/0124466 A1* | 5/2013 | Naidu | G06F 16/27 707/610 |
| 2014/0046909 A1* | 2/2014 | Patiejunas | G06F 16/24554 707/687 |
| 2014/0181041 A1* | 6/2014 | Whitehead | G06F 11/1448 707/652 |
| 2017/0177237 A1* | 6/2017 | Schnapp | G06F 3/0665 |
| 2017/0185604 A1* | 6/2017 | Broll | G06F 16/278 |

* cited by examiner

EARLY DETECTION OF CORRUPT DATA PARTITION EXPORTS

BACKGROUND

Several leading technology organizations are investing in building technologies that sell "software-as-a-service." Some such services provide access to shared storage (e.g., database systems) and/or computing resources to clients, or subscribers. Within systems that implement such services, different resources may be allocated to subscribers and/or their applications from whole machines, to CPU, to memory, to network bandwidth, and to I/O capacity.

Some such services may include database systems that manage large amounts of data on behalf of users. Such database systems may distribute and/or replicate user's data across two or more machines, often in different locations, for any of a number of reasons, including security issues, disaster prevention and recovery issues, data locality and availability issues, etc. These machines may be configured in any number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

In order to be able to recover from the malicious or inadvertent deletion of tables (or of portions thereof) and/or from logical data corruption, database users may wish to back up their tables periodically or on demand. Also, in the event of a failure of a replica or to increase durability, a database system may generate a new replica. In some instances, data corruption may occur during the process of creating a backup or a new replica. In some situations, data corruption may go undetected or detection may be delayed. This may lead to wasted resources being expended creating and/or storing a corrupt backup or replica. It may also result in a loss of redundancy or durability due to reliance on a corrupt backup or replica.

Figure 1A:
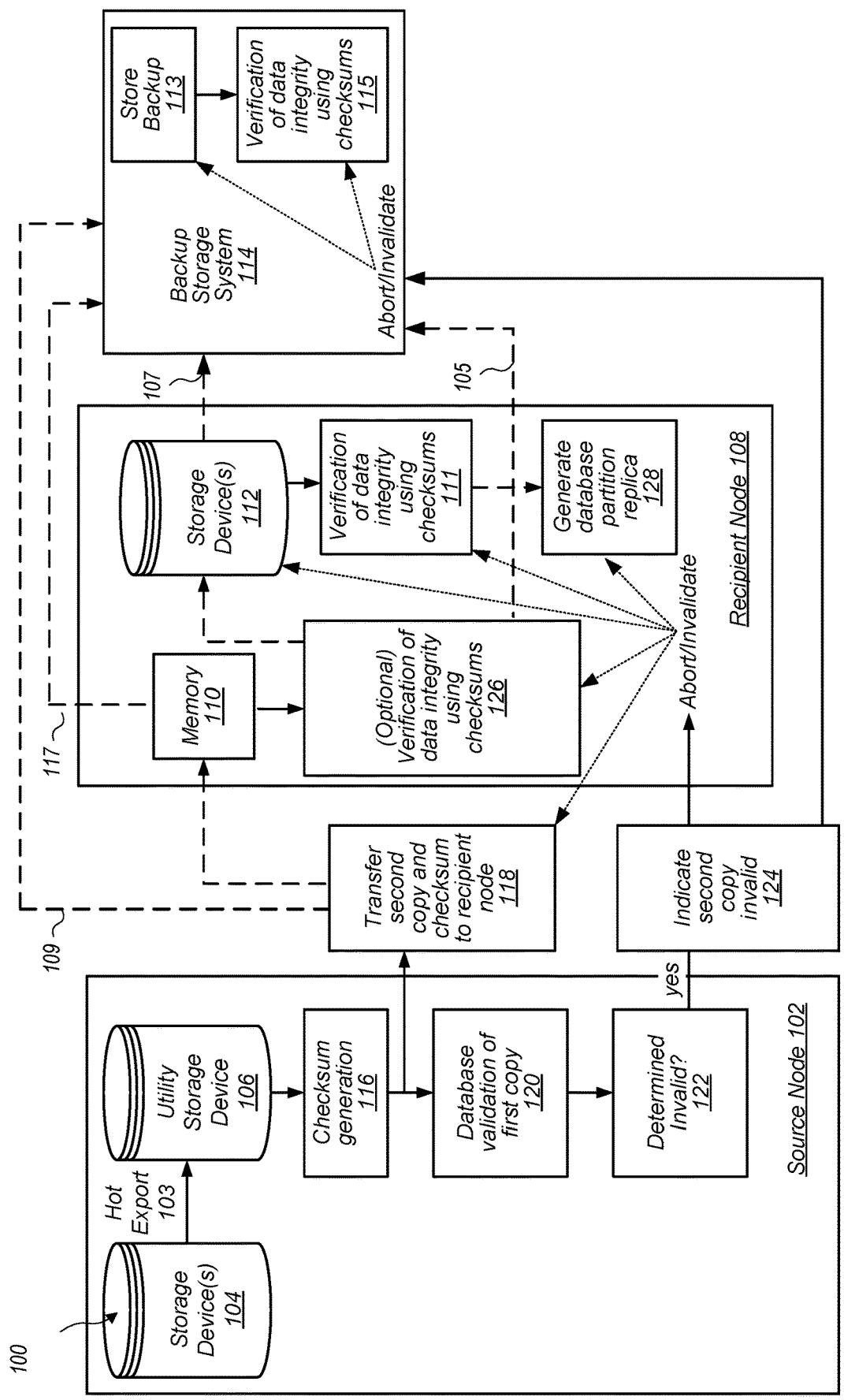
FIG. 1A is a block diagram illustrating early detection of corrupt data in a data partition export from a source node to a recipient node, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In some embodiments, a system comprises a plurality of nodes of a distributed storage system, wherein at least some of the nodes store database partitions of a database. At least one of the nodes is configured to send a first copy of one of the database partitions to a recipient node, wherein the recipient node is a node of the distributed storage system or a node of another storage system. The at least one node is also configured to validate, responsive to sending the first copy, a second copy of the database partition, wherein the second copy is stored in a data storage of the at least one node and cause the first copy of the database partition to be invalidated if the second copy of the database partition cannot be validated.

In some embodiments, a method includes validating a first copy of a data partition stored in a first data storage after initiating a store of a second copy of the data partition that is to a second storage; and invalidating the second copy of the data partition if the first copy of the data partition cannot be validated.

In some embodiments, a non-transitory, computer-readable storage medium, stores program instructions that when executed by one or more processors, cause the one or more processors to: validate a first copy of a data partition stored in a first data storage after initiating a store of a second copy of the data partition that is to a second storage and cause invalidation of the second copy of the data partition if the first copy of the data partition cannot be validated.

For example, a node of a distributed storage system may store a partition of a database and may perform a hot export operation to generate an up-to-date copy of the database partition while the database partition remains available to process read and write operations directed at the database partition. One or more database files and one or more metadata files may be generated as part of the hot export and may be locally stored on the node of the distributed storage system as a local copy of the database partition. Additionally, another copy of the database partition may be sent to a recipient node of the distributed storage system or a recipient node of another storage system, e.g. a sent copy of the exported database partition.

The sent copy of the database partition may be used to create a backup of the database partition at the recipient node. Also, a durable storage system storing multiple replicas of respective database partitions may generate a new replica of a database partition at a recipient node using a sent copy of database partition exported from another node, for example to replace a failed replica or to increase durability by adding additional replicas. In some embodiments, a sent copy may be sent to a backup storage system that is separate from a distributed storage system that includes a source node from which the second copy is sent.

In some situations, data included in one or more database files and/or one or more metadata files generated as part of a hot export that is sent to a recipient node may be corrupted during a hot export for example, while being stored locally, while being transported to a recipient node, or while being stored at the recipient node. In order to detect corruption early in the process of exporting a database partition and sending the exported database partition to a recipient node, a source node in parallel (or at least partially in parallel) with a recipient node receiving and storing a sent copy, may validate an exported one or more database files and one or more metadata files that are locally stored as a local copy of the exported database partition. The validation of the local copy may be performed responsive to a source node sending another copy of the database partition (e.g. the sent copy) to a recipient node. For example a source node may begin to validate a locally stored copy of a database partition while a sent copy is in transit and/or while a sent copy is being processed by a recipient node. In some situations, a source node may validate a locally stored copy of a database partition subsequent to a sent copy being processed at a recipient node.

In some embodiments, a source node may validate a locally stored copy of a database partition by verifying the database will load as a database from the one or more database files and the one or more metadata files included in the locally stored copy. If the local copy of the database partition cannot be validated, the source node may instruct the recipient node to invalidate the sent copy of the database partition and/or to discontinue further processing of the sent copy of the database partition.

In some embodiments, a source node may further generate a checksum for each database file and/or each metadata file included in an exported database partition (e.g., a checksum may be generated according to the MD5 message digest algorithm). The source node may generate the checksums prior to sending a sent copy of the database partition and may include the checksums along with the one or more database files and one or more metadata files included in the sent copy. A recipient node may use the checksums to perform a checksum verification to determine that the received files received at the recipient node match the one or more database files and the one or more metadata files stored locally at the source node. Thus, if the database is validated at the source node and the checksums are verified at the recipient node, it can be ensured that (1) the local copy of the datable partition and the sent copy of the database partition are matching copies of the database partition and (2) both copies of the database partition are valid copies of the database partition (because the local copy was validated and the checksums ensure that the sent copy matches the local copy). Also, because the source node performs the validation responsive to sending the sent copy of the database partition to the recipient node, invalid copies of the database partition may be invalidated early, potentially before the sent copy is received or fully processed by the recipient node. In addition, invalid database partition copies may be identified before being exposed to a customer as a backup copy. Also invalid database partition copies may not be relied upon as backups or replicas due to actively validating each database partition copy responsive to sending a sent copy of the database partition to a recipient node.

In some embodiments, the systems and methods described herein may be employed in various combinations and in various embodiments as part of implementing a Web-based service that provides data storage services to storage service clients (e.g., user, subscribers, or client applications that access the data storage service on behalf of users or subscribers). The service may in some embodiments support the seamless scaling of tables that are maintained on behalf of clients in a non-relational data store, e.g., a non-relational database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table or partition or creating a replica of a database table or partition as an asynchronous operation while the database continues to receive, accept, and service read and/or write operations that are directed to the table or partition, for example during a hot export of a database partition. In some embodiments, in response to a request to back up a table, the system may create a backup of each individual database partition independently and (in some cases) in parallel (i.e., substantially concurrently). When a request to back up a table is received, the system may guarantee that all write operations that were directed to the table up to that point are included in the backup. In a similar manner, when creating a new replica, for example in response to a replica failure, the system may guarantee that all write operations that were directed to a table included in a partition that is being replicated are included in a newly generated replica. In some embodiments, performing a hot export may comprise applying all received write operations directed to a table included in a database partition that is being exported prior to generating one or more database files and/or one or more metadata files for the hot export of the database partition. However, the system may not guarantee that the backup operation or replica generation produces a consistent view of the entire table (e.g., a consistent point-in-time snapshot of the table). Instead, the system may guarantee only that the backup includes a consistent view of each partition of the table.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed storage system, where those replicas make up a replica group. In some embodiments, membership in various replica groups may be adjusted through replicated changes, and membership and other updates in the system may be synchronized by synchronizing over a quorum of replicas in one or more data centers at failover time.

In some embodiments of the distributed storage systems described herein, each storage node may include multiple storage devices or logical volumes, some of which store various partition replicas. For example, in one embodiment each storage node of a distributed storage system may include five storage devices or logical volumes. In some embodiments, at least one of the storage devices may be a utility storage device used for processing exports, replica generation and backup creation, wherein other ones of the storage devices of the node may be used to store active replicas of client databases. Thus, operations, such as I/O operations, performed to validate an export file may be performed on a utility storage device without impacting I/O performance of other ones of the storage devices of the node hosting replicas of active client databases.

From a user's perspective, a backup operation may operate to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). The metadata resulting from an export operation may include the table schema (e.g., the hash key and range key set up for table, and the maximum item size) or, in general, any of all information about the table at the time of the export (e.g., all of the metadata of the table at the time of export), and also information about each backup operation for the table (e.g., the time is was requested, by whom it was requested, the time at which it finished, and/or an indication of whether it was copied to other regions). In some embodiments, the metadata that is included as part of an export operation may also include an indication of the version of the database software under which the source table was created and/or exported, an indication of the storage format version that was used for the export.

FIG. 1A is a block diagram illustrating early detection of corrupt data in a data partition export from a source node to a recipient node, according to some embodiments.

System 100 illustrated in FIG. 1A includes source node 102, recipient node 108, and (optionally) backup storage system 114. As illustrated in FIG. 1A an exported copy of a database partition stored in storage devices 104 of source node 102 is being sent to recipient node 108 and/or to back-up storage system 114 in a system that includes early detection of corrupt database partition exports.

In some embodiments, an exported copy of a database partition may be sent to a recipient node in a same distributed storage system of which the source node is a part or an exported copy of a database partition may be sent to a node of a separate storage system. For example, in some embodiments, source node 102 and recipient node 108 may be nodes of a common distributed storage system, or may be nodes of different distributed storage systems. In some embodiments, a recipient node may be a storage system with a different organizational schema than that of a source node. For example, in some embodiments, a source node may be part of a low latency storage system, such as a key-value based storage system, and a recipient node may be part of a lower cost, higher latency storage system, such as an object based storage system. For example, in some embodiments, backup storage system 114 may be a recipient node and may be an object based storage system with lower cost and higher latency than a storage system of which source node 102 is a part. Also, in some embodiments, (as shown by dotted lines 105 and 107) an exported copy of a database partition may be sent to a recipient node and the recipient node may in turn generate a backup of the database partition to be stored in a backup storage system, such as backup storage system 114. In some embodiments, a backup storage system may be a lower cost, higher latency storage system, such as an object based storage system.

In some embodiments, a source node, such as source node 102, may include storage devices such as hard drives or solid-state memory devices, such as storage devices 104. In some embodiments, storage devices 104 may be logical volumes implemented on underlying hardware. In some embodiments, a source node may also include one or more utility storage devices, such as an additional hard drive, solid-state memory, or logical volume, for example utility storage device 106. In some embodiments, active replicas of database partitions may be stored on storage devices, such as storage devices 104, while utility operations may be performed on a utility storage device, such as utility storage device 106. In some embodiments, active replicas stored on storage devices, such as storage devices 104, may be available to accept read requests and write requests from clients of a distributed data storage system, while database partition copies stored on a utility storage device, such as utility storage device 106, may not be visible to clients of a distributed data storage system.

In some embodiments, a hot export may be performed at a source node to generate an up-to-date copy of a database partition stored on the source node. The hot export may be stored to a utility storage device, such as utility storage device 106 of the source node 102. For example, a hot export 130 may be performed for a database partition stored on storage devices 104 of source node 102 to generate one or more database files and one or more metadata files indicating a current state of a database partition stored in storage devices 104. In some embodiments, various hot export utilities may be used to perform a hot export of a database partition while the database partition remains available to accept read and write requests from clients. For example, in some embodiments, a source node, such as source node 102, may store a partition of a database and an export utility such as Percona XtraBackup, may be used to generate a hot export of a database partition stored in storage devices 104. In some embodiments, a source node may store a database partition using various other relational or non-relational database formats. Also, in some embodiments, various other export utilities may be used to perform a hot export of a database partition.

A local copy of a database partition exported from storage devices 104 may be stored in utility storage device 106 of source node 104. At 116, a checksum may be generated for files included in the local copy of the database partition stored on the utility storage device, such as utility storage device 106. In some embodiments generating a checksum for a local copy of a database partition stored in a utility storage device, such as utility storage device 106, may minimally impact a performance of a source node, such as source node 102. This is at least partially because I/O operations for generating the checksum may be performed on the utility storage device as opposed to storage devices, such as storage devices 104, hosting active database partitions. In some embodiments, a checksum may be generated for an overall export file, and additional checksums may be generated for individual database files and metadata files included in an export file. Also, in some embodiments, a checksum may be generated for each individual database file name included in the metadata of the export file. In some embodiments, a checksum may be generated for each row within a database partition of an export file.

Once checksums are generated at 116, the checksums may be stored with the one or more database files and the one or more metadata files resulting from the export of the database partition. For example, the checksums may be stored with the exported database partition stored in the utility storage device, such as utility storage device 106. The generated checksums may stay together with the one or more database files and one or more metadata files as a first copy of the database partition. At 118, in response to generating the checksums at 116, a source node may generate and transfer a second copy of the database partition that includes the one or more database files, the one or more metadata files, and the generated checksums to a recipient node. At the same time or immediately following sending the second copy of the database partition, the source node, at 120, may perform a database validation using the local first copy of the database partition remaining stored on the utility storage device, such as utility storage device 106.

In some embodiments, performing a database validation may involve I/O intense operations, such as reading database files and metadata files from the utility storage device to load the database from the local first copy of the database partition to verify that the database can load from the stored local copy. However, since the local database partition copy is stored on a utility storage device, I/O operations due to validating the local copy of the database partition may not effect performance of the active database that includes database partitions stored on storage devices separate from the utility storage device, such as storage devices 104 that are separate from utility storage device 106.

In some embodiments, validating the local copy of the database partition may include simply loading the database from the local copy to ensure that the database can be loaded from the one or more database files and the one or more metadata files included in the local copy. In some embodiments, validating the local copy of the database partition may further include verifying item counts of items included in the database subsequent to loading the database from the one or more database files and the one or more metadata files included in the local copy of the database partition. In some embodiments, a validation of a local or "first" copy of a database partition may take place a) while a second or "sent" copy of the database partition is being sent to a recipient node, b) while a checksum verification is being performed at a recipient node for a sent copy, and/or c) while a streaming checksum is being performed on a portion of a sent copy that is being stored to a final destination such as a storage device of the recipient node or a backup storage system. Thus, by performing a validation in parallel or at least partially in parallel with any one of these three operations, a distributed storage system may detect corrupt data in a database partition export pipeline more quickly than other systems that either do not validate exported database partitions or that verify database partitions at a destination location.

In some embodiments, a second or sent copy of a database partition may initially be stored in a memory of a recipient node. In other embodiments, a second or sent copy of a database partition may be directly stored to a storage device of the recipient node. For example, a sent copy may be stored to memory 110 of recipient node 108, or in other embodiments, may be stored directly to storage devices 112. In some embodiments, a second or sent copy may be stored to a utility storage device of a recipient node, such as a utility storage device 106 of a recipient node 108 (not shown for recipient node 108). In some embodiments, a checksum verification may be performed at a recipient node, such as recipient node 108, to ensure that a received second or sent copy of a database partition matches a first or local copy of the database partition. Thus, by verifying checksums for one or more database files and/or one or more metadata files of the sent copy compared to checksums generated based on the first or local copy, it can be ensured that the second or sent copy of the database partition matches the first or local copy of the database partition that has been validated at the source node. In some embodiments, an additional streaming checksum verification may be performed on a sent copy of a database partition as the sent copy is being stored from a memory, such as memory 110, or a from a utility storage device, such as a utility storage device 106 (not shown), to a destination storage device, such as one of storage devices 112 or backup storage system 114. In a similar manner, a checksum verification may be performed on a sent copy of a database partition after the sent copy of the database partition is stored at a destination storage device, such as storage devices 112 or backup storage system 114.

For example, dotted line 107 shows a sent copy of a database partition being stored to backup storage system 114 from storage devices 112 of recipient node 108. In such embodiments, a checksum verification 113 may be performed at backup storage system 114 after the sent copy of the database partition is transferred from the storage devices 112 to the backup storage system 114. Optionally, a streaming checksum may also be performed as the data of the sent copy of the database partition is being transferred. In some embodiments, a sent copy of a database partition may go directly from a memory of a recipient node, such as memory 110 of recipient node 108, to a backup storage system, such as backup storage system 114 (as shown by dotted line 105). In such an embodiment, a checksum verification, such as checksum verification 126, may be performed on chunks of a sent copy of a database partition as the chunks of the sent copy of the database partition are being stored to the backup storage system from the memory of the recipient node. Additionally a checksum verification 113 may be verified at the backup storage system once the sent copy is stored in the backup storage system. Once the checksum is validated a backup copy of the database partition may be stored or continue to be stored as a valid copy of the database partition in the backup storage system at 115.

In some embodiments, a data integrity verification, such as checksum verification 111, may be performed on a second or sent copy of a database partition, once the sent copy of the database partition is stored to a destination storage device. In some embodiments, a data integrity verification at a destination storage device may be performed before the second or sent copy is used to generate a replica at the destination storage device. For example, checksum verification 111 may be performed before generating a replica of the database partition at 128.

Additionally, in some embodiments, a second or sent copy of a database partition may be transferred over a network directly to a backup storage system, such as backup storage system 114, without passing through an additional recipient node. Said another way, in some embodiments, a backup storage system may include a recipient node. In such embodiments, verification of data integrity using checksums, such as described in 126, may be performed by a backup storage system, such as backup storage system 114. For example, dotted line 109 shows a second or sent copy of the exported database partition being sent directly to backup storage system 114. Data integrity verification may be performed at 115 and a backup copy of the database partition may be stored in backup storage system 114 or may continue to be stored in backup storage system 114 as a valid copy of the database partition at 113. In some embodiments, storage of a backup copy at a destination storage device may take place before a data verification is performed at 115 as shown in FIG. 1A. In other embodiments, data verification may be performed before a backup copy is stored to a destination storage device. Note that in FIG. 1A dotted lines are used to illustrate optional paths a second or sent copy may take when being sent to and processed by a recipient node. In some embodiments, a distributed data storage system may support only some or all of the optional paths shown in FIG. 1A.

Additionally, in some embodiments, an exported copy of a database partition may be sent to a backup storage system from a memory of a recipient node without passing through a checksum verification step performed in the memory of the recipient node (as shown by dotted line 117). For example, a second copy of an exported database partition and checksums generated at 116 may pass through memory 110 of recipient node 108 and be forwarded to backup storage system 114, wherein verification of data integrity 115 is performed using the checksums generated at 118, and if the data integrity verification passes and an indication of invalidity has not been received, the backup of the database partition continues to be stored in backup storage system 114 as shown in 113. In some embodiments, the data verification using checksums at the backup storage location may be performed after a second copy of a database partition is stored to a final storage destination (as shown in FIG. 1A). In other embodiments, a data verification using checksums may be performed at an intermediate storage location of a backup storage system, such as a memory or utility storage device of backup storage system 114, before the second copy of the database partition is stored to a final storage destination.

At 122, if it is determined that a first or local copy of a database partition cannot be validated, for example the database cannot be loaded from one or more database files and one or more metadata files included in the first or local copy of the database partition, the source node may send an indication, such as indication 124, to a recipient node, such as recipient node 108, or in some embodiments to a backup storage system, such as backup storage system 114, indicating that the sent copy of the database partition is invalid and should not be further processed. Since the source node is performing the database validation (120) while the sent copy is being transmitted ( ) and possibly while the sent copy is being verified (126, 111, 113) or stored to a final destination (128, 105, 107, or 115), the indication that the sent copy of the database partition is invalid may cause the recipient node (or backup storage system) to abort further processing of the sent copy at any of these stages of processing. For example, due to variances in network speed, processing speed of a recipient node, etc. which portion of the process the recipient node is currently performing when an indication (124) that the sent copy is invalid may vary from embodiment to embodiment or within embodiments. However, the recipient node may proactively abort further processing of the sent copy in response to receiving an indication that the sent copy of the database partition is invalid regardless of which step of processing the sent copy the recipient node is currently performing.

In some embodiments, a recipient node may roll back processing steps that have already been completed in response to receiving an indication that a sent copy of a database partition is invalid. For example, in some embodiments, a recipient node, such as recipient node 108, may generate a database partition replica (128) based on one or more database files and one or more metadata files included in a sent copy of a database partition. For example, the one or more database files and one or more metadata files may be used to bootstrap a new replica in order to replace a failed replica or to add an additional replica to a replica group to increase durability of the replica group. Also, in other embodiments, a recipient node or backup storage system may generate a backup of a database partition based on one or more database files and one or more metadata files included in a sent copy of a database partition. In either case, a recipient node or backup storage system may mark a replica as invalid or a backup as invalid, if the replica or backup has already been generated in response to receiving an indication that a sent copy of a database partition is invalid. Furthermore, in some embodiments, a recipient node may cause an invalid replica or backup to be deleted in response to receiving an indication that a sent copy of a database partition is invalid.

In some embodiments, a recipient node or backup storage system may be configured to assume a second or sent copy of a database partition is valid until receiving an indication that the second or sent copy of the database partition is invalid. For example, a recipient node, such as recipient node 108, may continue to process a sent copy through steps 126 and/or 128 until receiving an indication that the sent copy is invalid. If the sent copy is determined valid at a source node, such as source node 102, in some embodiments, no notification may be sent at 124 and recipient node 108 may store a backup or replica based on the sent copy of the database partition assuming the replica or backup is valid due to the lack of indication of invalidity. In some embodiments, a recipient node may wait a threshold amount of time (without receiving an indication of invalidity) before considering a received sent copy of a database partition valid. In other embodiments, a source node, such as source node 102, may send an indication that a first or local copy of the database partition has been validated (not shown). In some embodiments, a recipient node, such as recipient node 108, may delay generating a replica from a sent copy, such as at 128, until receiving an indication from a source node that the sent copy of the database partition is valid or until a threshold amount of time has passed without receiving an indication of invalidity.

In some embodiments, a source node, such as source node 102 may throttle various operations, such as hot export 130, checksum generation 116, or database validation 120 to ensure service commitments to clients having active database partitions stored on source node 102 are met.

Figure 1B:
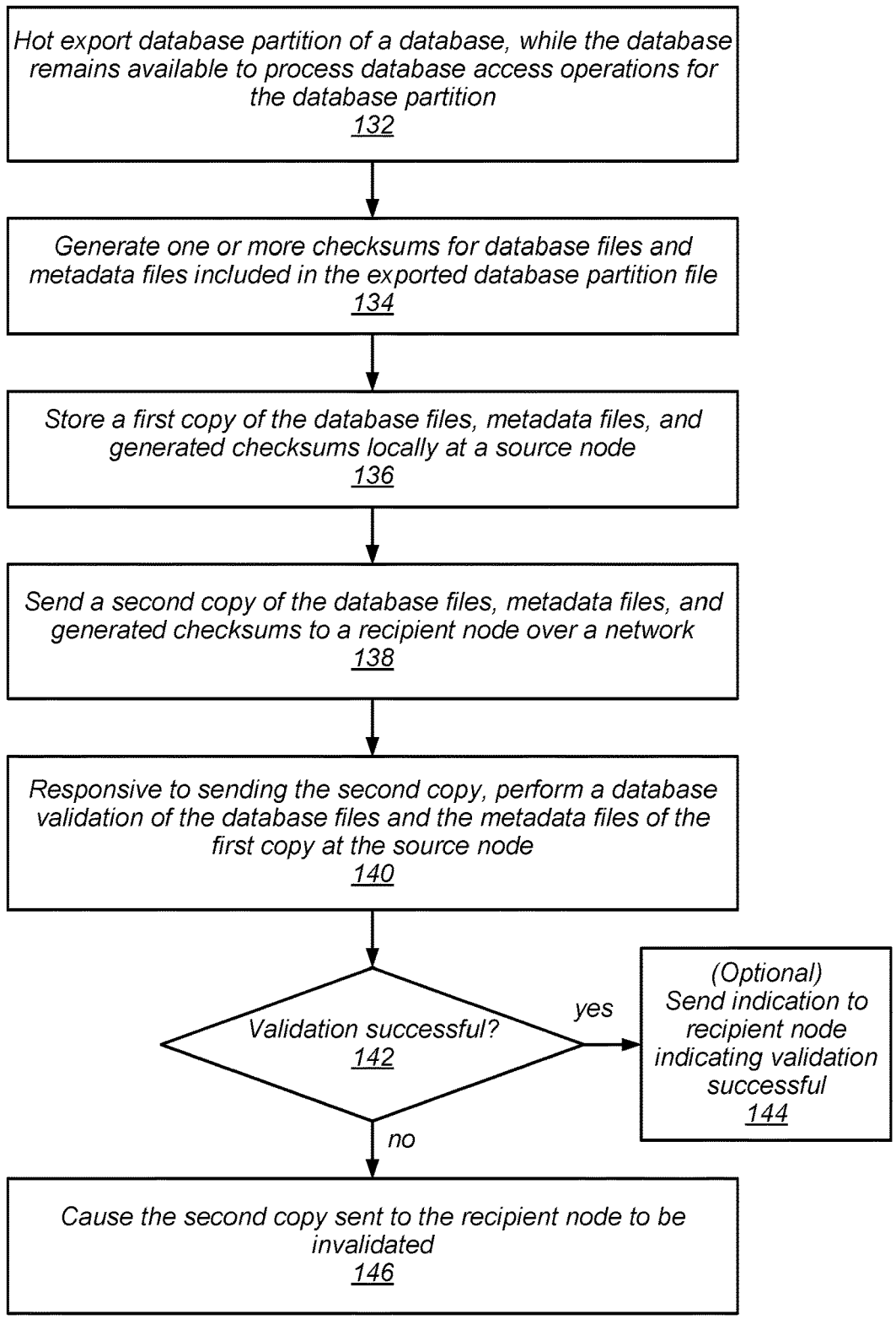
FIG. 1B is a flow diagram illustrating a process of performing early detection of corrupt data from the perspective of a source node, according to some embodiments.

FIG. 1B is a flow diagram illustrating a process of performing early detection of corrupt data from the perspective of a source node, according to some embodiments.

At 132, a source node, such as source node 102, performs a hot export of a database partition of a database. The export comprises data and metadata for the database partition in a file format that can be used to restart or replicate the database partition. An export utility may be used such that the database partition remains available to process access operations such as read and write requests, while the hot export is being performed. For example, in some embodiments, a source node may store a partition of a database and an export utility such as Percona XtraBackup, may be used to generate a hot export of a database partition. In some embodiments, a source node may store a database partition using various other relational or non-relational database formats. Also, in some embodiments, various other export utilities may be used to perform a hot export of a database partition.

At 134, one or more checksums are generated for the hot export. In some embodiments, an overall checksum may be generated for the hot export and one or more additional checksums may be generated for individual database files and individual metadata files included in the hot export. In some embodiments, a checksum may be generated for each database file name included in the metadata. In some embodiments, a checksum may be generated according to the MD5 message digest algorithm, or other suitable data verification algorithm.

At 136, the hot export including the generated checksums is stored locally on the source node. In some embodiments, the one or more database files and one or more metadata files may be stored before generating the checksum at 134 or may be maintained in memory and stored to a storage device with the generated checksums subsequent to generating the checksums at 134.

At 138, a second copy of the export including the generated checksums, the one or more database files, and the one or more metadata files is sent to a recipient node over a network. For example, in some embodiments, a source node may be located in one geographic region, such as an availability zone of a provider network and a source node may be located in a different geographic regions, such as a different availability zone of a provider network. In some embodiments, a source node and a recipient node may be part of a distributed storage system implemented across multiple geographic regions and/or multiple data centers.

At 138, responsive to sending the second copy of the export to the recipient node, the source node may perform a database validation using a local copy of the export remaining stored at the source node. For example a source node may begin to validate a locally stored copy of a database partition while a sent copy is in transit and/or while a sent copy is being processed by a recipient node. In some situations, a source node may validate a locally stored copy of a database partition subsequent to a sent copy being processed at a recipient node.

In some embodiments, a source node may validate a locally stored copy of a database partition by verifying the database will load as a database from the one or more database files and the one or more metadata files included in the locally stored copy. If the local copy of the database partition cannot be validated, the source node may instruct the recipient node to invalidate the sent copy of the database partition and/or to discontinue further processing of the sent copy of the database partition. For example, at 142 it is determined if the validation was successful and at 146 in response to determining the local copy of the database partition cannot be validated, an indication is sent to the recipient node indicating that the sent copy is invalid.

In some embodiments, a source node may send, at 144, an indication to a recipient node indicating that a sent copy of a database partition has successfully been validated at the source node.

Figure 1C:
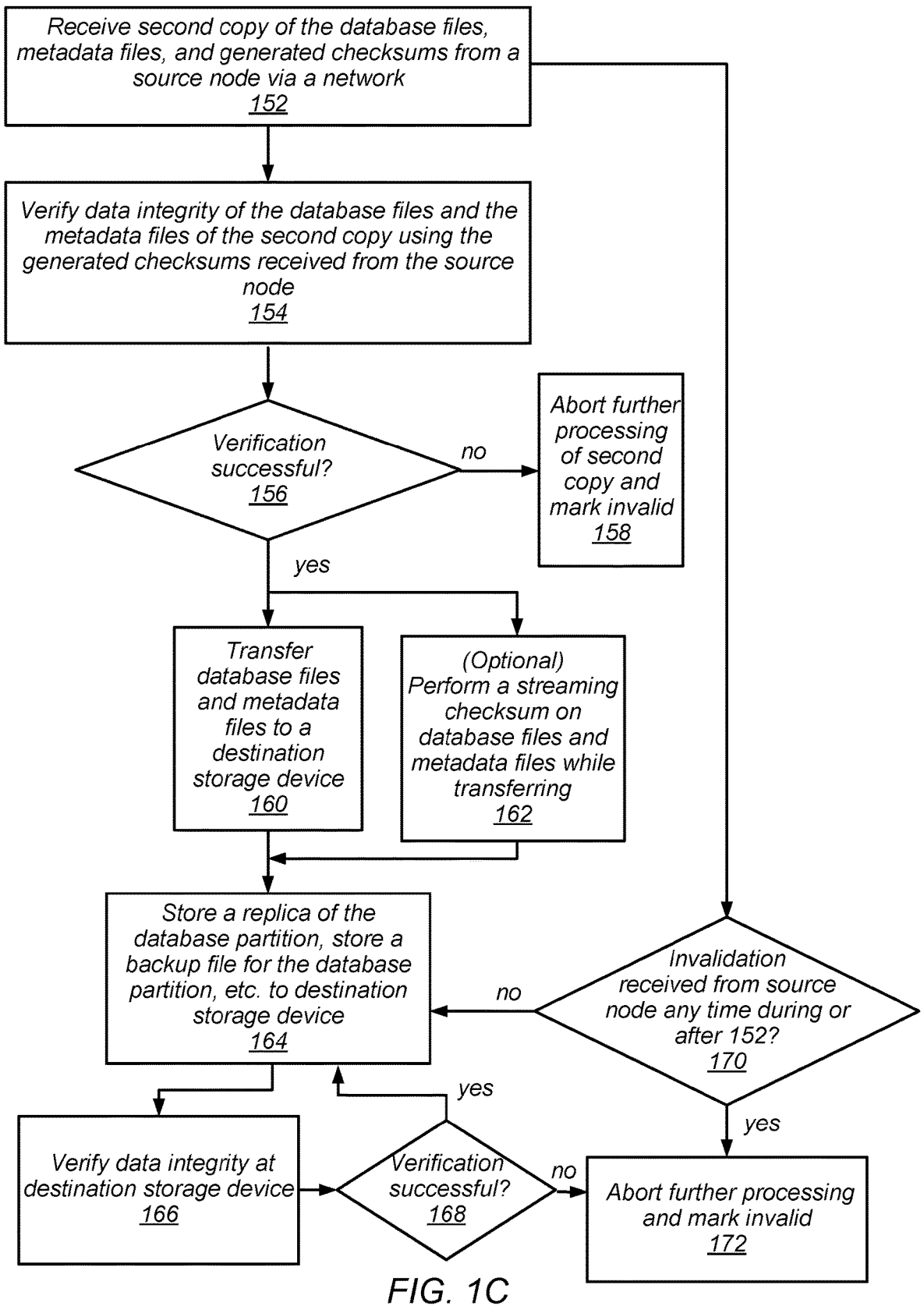
FIG. 1C is a flow diagram illustrating a process of performing early detection of corrupt data from the perspective of a recipient node, according to some embodiments.

FIG. 1C is a flow diagram illustrating a process of performing early detection of corrupt data from the perspective of a recipient node, according to some embodiments.

At 152, a recipient node, such as recipient node 108, receives a second copy of an exported database file that includes checksums such as those generated at 134. In some embodiments, until a recipient node receives an indication that the sent or second copy of the export is invalid, the recipient node may assume the received second copy is valid and processes it accordingly.

At 154, the recipient node verifies data integrity of the received second copy (sent copy) using the generated checksums included with the second copy. For example, by comparing a checksum generated at the recipient node to a generated checksum included with the second copy, the recipient node may be able to determine that the files included in the second copy match the files included in the first copy for which the original checksums were generated. In some embodiments, various data verification techniques may be used to verify data integrity of a received second copy. At 156, it is determined if the data integrity verification of the received second copy was successful. If so, the recipient node continues processing the received second copy at 160. If not, the recipient node aborts further processing of the received second copy at 158.

At 160, in response to verifying the data integrity of the received second copy, the recipient node transfers the database files and metadata files of the received second copy to a destination storage device. In some embodiments, a destination storage device may be a storage drive, such as a hard drive, solid state memory, or logical volume of the recipient node. In some embodiments, the destination storage device may be a backup storage system, such as backup storage system 114. In some embodiments, a received copy may be verified at a utility storage device and may be sent to a destination storage device that is a non-utility storage device of the recipient node. In some embodiments, a recipient node, at 162, may perform a streaming checksum verification on the database files and metadata files while the database files and the metadata files are being stored to a destination storage device.

At 16, the verified and validated second copy of the database partition may be used to generate a replica of the database partition, for example by bootstrapping a new replica from the one or more database files and metadata files. Also, in some embodiments a backup copy of the database partition may be stored based on the verified and validated second copy of the database partition. In some embodiments, a snapshot copy of a current state of the database partition may be stored based on the verified and validated second copy of the database partition.

At 166, an additional data integrity verification is performed at the destination storage destination to verify that the second copy of the database partition was not corrupted while being transported and stored to the destination storage device. If the data integrity at the destination storage destination cannot be verified at 166, at 168 it may be determined that the data integrity verification was not successful and the second copy may be marked as invalid and/or deleted at 172. If it is determined that the data integrity verification was successful at 168, the stored second copy of the data partition, replica generated from the second copy of the database partition, the backup, etc. may continue to be stored on the destination storage device as a valid replica, backup, etc. In some embodiments, the data integrity verification performed at the destination storage device may be performed using one or more checksums generated at the source node and received with the one or more database files and the one or more metadata files of the second copy.

In some embodiments, one or more intermediate data integrity verification steps, such as 154 or 162, may be omitted and/or performed at a destination storage device, such as in step 166.

At 170, it may be determined during any of the steps 152-168 described above that a received second copy of a database partition received at a recipient node is invalid in response to receiving an invalidation notice from a source node, such as source node 102. At 172, in response to receiving an invalidation notice any time after a second copy of a database partition is sent from a source node, a recipient node, such as recipient node 108, may abort further processing of the second copy of the database partition, roll back any processing that has already occurred, and mark any files stored as a result of receiving the second (sent) copy of the database partition as invalid and/or delete the invalid files.

Figure 2:
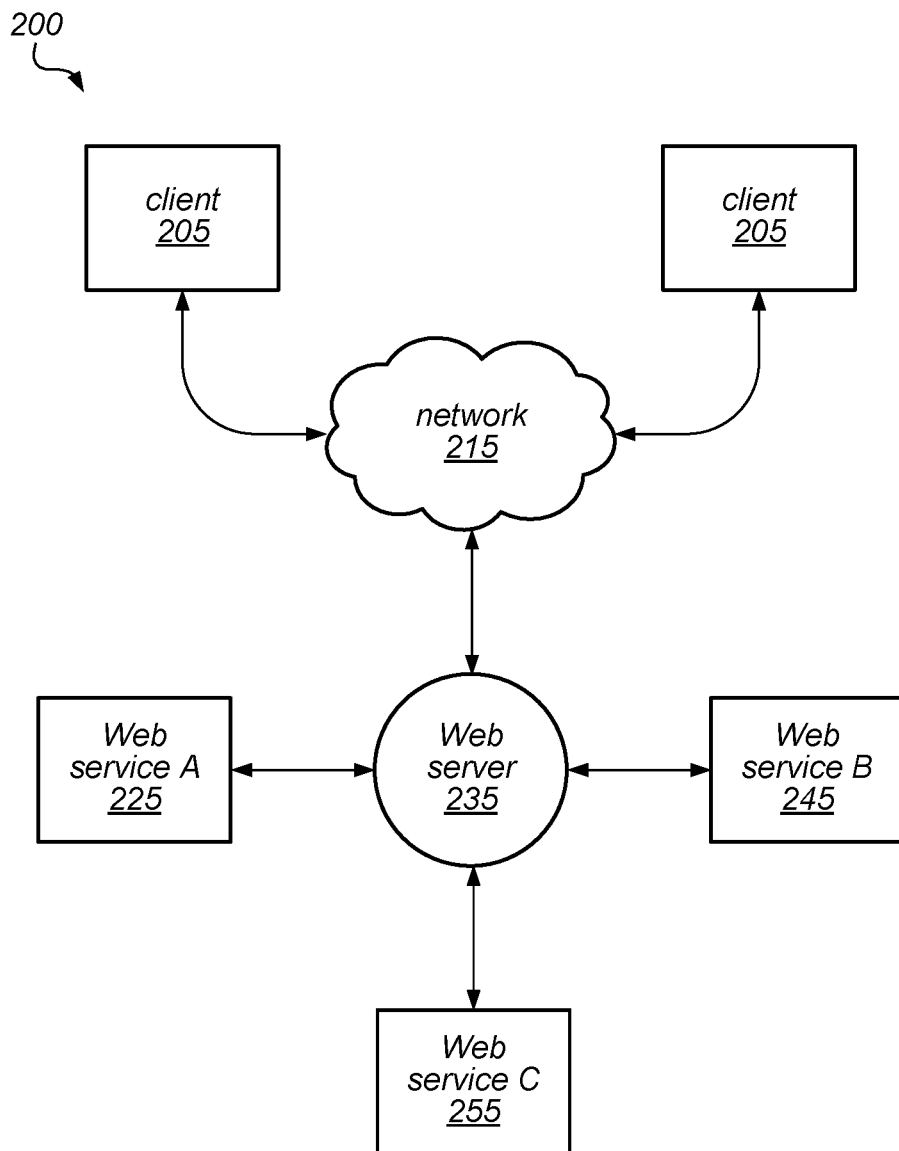
FIG. 2 is a block diagram illustrating one embodiment of a system that provides various Web-based services to clients.

FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of: computational resources, database services, data storage services (e.g., maintaining data in one or more tables on behalf of a client), or any other types of services or shared resources.

Figure 3:
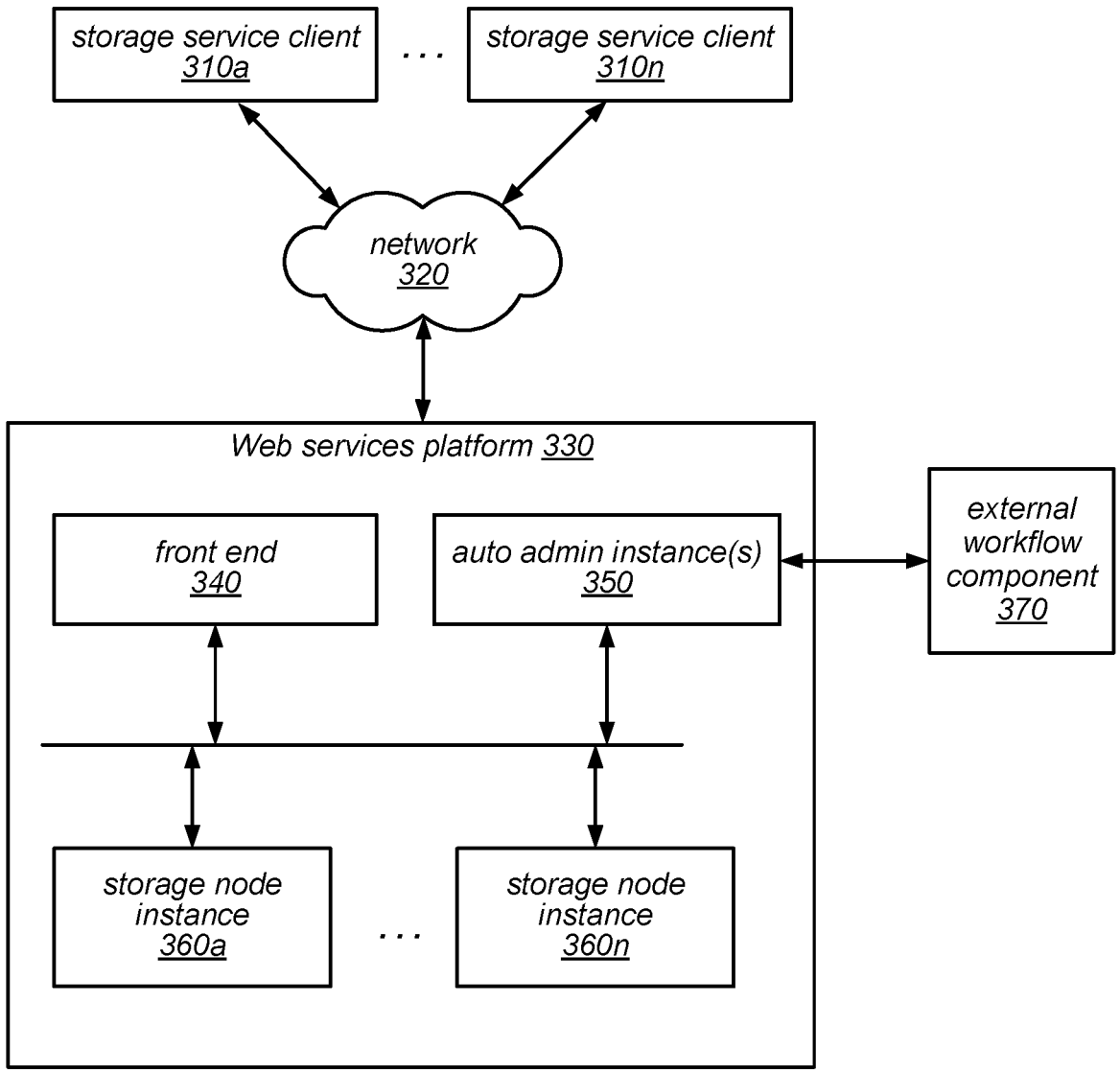
FIG. 3 is a block diagram illustrating one embodiment of a system architecture that is configured to implement a Web services-based data storage service.

One embodiment of a system architecture that is configured to implement a Web services-based data storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computing node illustrated in FIG. 6 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include a front end 340 (which may be configured to receive, authenticate, parse, throttle and/or dispatch service requests, among other things), one or more administrative components, or auto admin instances, 350 (which may be configured to provide a variety of visibility and/or control functions), and a plurality of storage node instances (shown as 360a-360n), each of which may maintain and manage one or more tables on behalf of clients/users or on behalf of the data storage service (and its underlying system) itself. In some embodiments, each of the multiple auto admin instances may be responsible for managing and/or allocating the resources of a subset of the storage node instances 360 (e.g., the storage capacity and/or throughput capacity of the storage node instances 360 and/or their underlying storage devices or virtual storage volumes). For example, in some embodiments, each auto admin instance 350 may be configured to select a storage node and/or particular storage devices or virtual storage volumes on which to place various tables, partitions, and replicas, which may include receiving metadata about the storage nodes and/or storage devices/volumes, recommendations of storage devices/volumes on which to place the tables, partitions, and replicas, confirmation of resource reservations, or other information from the storage node instances for which it provides administrative functionality. Some of the functionality provided by each of these types of components is described in more detail herein, according to various embodiments.

Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components of the system that use external workflow component 370 may include these interfaces rather than interfacing directly to the interfaces provided by external workflow component 370. In some embodiments, the Web services platform 330 may rely on one or more external (and in some cases shared) resources, in addition to external workflow component 370. In some embodiments, external workflow component 370 may be used to perform distributed operations, such as those that extend beyond a particular partition replication group.

As described in more detail herein, in some embodiments, external workflow component 370 may include a workflow manager (e.g., a state machine) that controls, coordinates, and monitors the progress of various backup and restore operations. For example, external workflow component 370 may be configured to keep track of what has been done (e.g., which partitions have been backed up or restored) and pending work (e.g., which partitions have not yet been successfully backed up or restored), and/or to handle failures encountered during backup and restore operations (e.g., to initiate retries). In some embodiments, requests for backup and restore operations may be received by the front end 340, which may log the requests. In some embodiment, logging such a request may subsequently trigger an action by an auto admin instance 350 to invoke external workflow component 370, which may manage the backup or restore operation. Note that if two different storage system users have tables with partitions on the same machine that they want to back up, the external workflow component 370 may be configured to avoid resource conflicts or overuse (e.g., by using alternate replicas of some of the partitions on different machines as the source for their backup operations).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
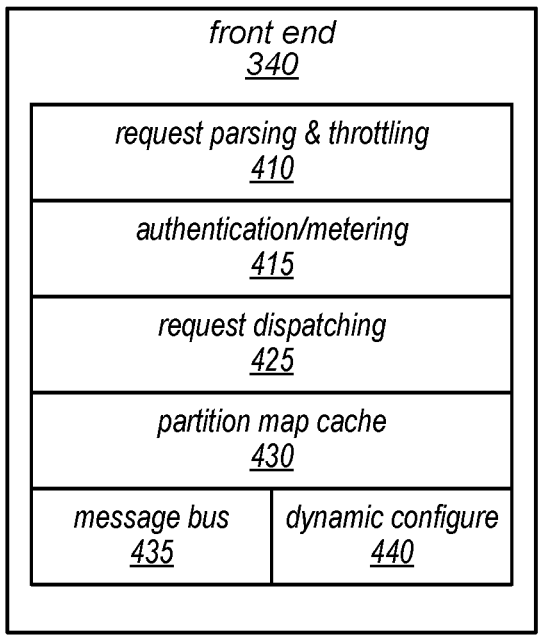
FIGS. 4A-4C are block diagrams illustrating various components of a Web services platform, according to one embodiment.
Figure 4B:
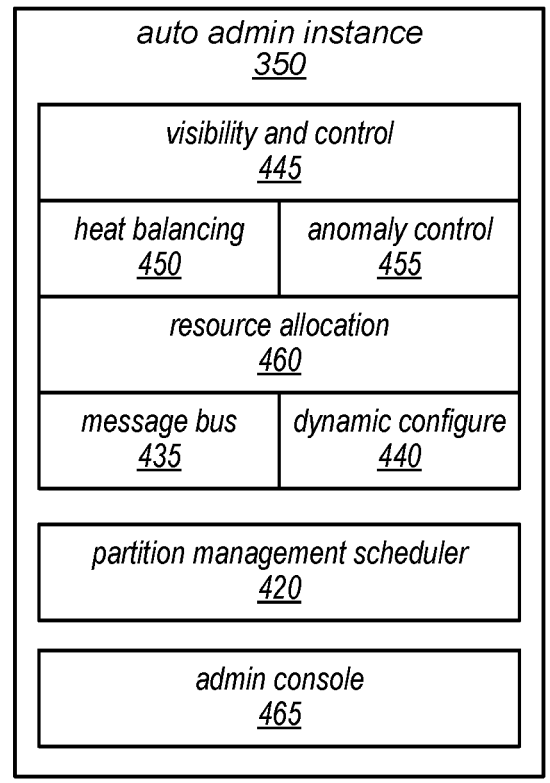
Figure 4C:
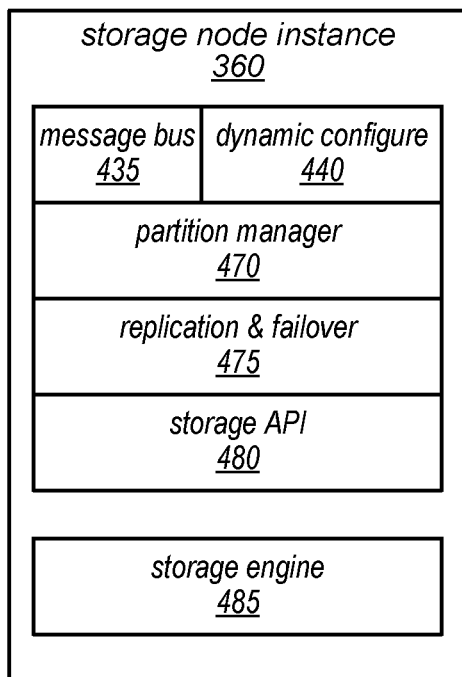

FIGS. 4A-4C illustrate various elements or modules that may be included in each of the types of components of Web services platform 330, according to one embodiment. As illustrated in FIG. 4A, front end 340 (which may sometimes be referred to herein as a request router) may include one or more elements configured to perform parsing and/or throttling of service requests (shown as 410), authentication and/or metering of service requests (shown as 415), dispatching service requests (shown as 425), and/or maintaining a partition map cache (shown as 430). In addition to these component-specific elements, front end 340 may include components that are common to multiple types of computing nodes that collectively implement Web services platform 330, such as a message bus (shown as 435) and/or a dynamic configuration component (shown as 440). In other embodiments, more, fewer, or different elements may be included in front end 340, or any of the elements illustrated as being included in front end 340 may be included in another component of Web services platform 330 or in a component configured to interact with Web services platform 330 to provide the data storage services described herein.

As illustrated in FIG. 4B, auto admin instance 350 may include one or more elements configured to provide visibility and control to system administrators (shown as 445), or to perform heat balancing (shown as 450), and/or anomaly control (shown as 455), resource allocation (shown as 460). In some embodiments, resource allocation component 460, heat balancing module 450, and/or anomaly control component 455 may be configured to work separately or in combination to perform selection, ordering, or scheduling of candidate partition management operations (e.g., various partition splitting operations or partition moving operations) and/or to select destination storage nodes (and/or particular storage devices/volumes) for those operations. In other embodiments, a central partition management scheduler component 420 (which may perform some or all of these partition management functions) may be included in auto admin instance 350, as illustrated in FIG. 4B. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific elements, auto admin instance 350 may also include components that are common to the different types of computing nodes that collectively implement Web services platform 330, such as a message bus (shown as 435) and/or a dynamic configuration component (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more components configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned (or reserved) resources on the storage devices or logical storage volumes of the storage node instance. For example, the partition manager may be configured to apply one or more resource utilization policies or partition management policies to make local decisions about which, if any, partitions or partition replicas stored on the local storage devices or logical storage volumes should be split or moved. Once the partition manager 470 (or another component of storage node instance 360) identifies one or more candidate partition management operations, information about the candidate partition management operations may be sent to an auto admin instance 350 (e.g., to a central partition management scheduler 420 of an auto admin instance 350), which may schedule the candidate partition management operations for execution based on a global prioritization across the distributed database system. In other embodiments, resource utilization information may be sent from each storage node instance 360 to an auto admin instance 350 (e.g., to a central partition management scheduler 420 of an auto admin instance 350), which may identify candidate partition management operations, and may schedule the candidate partition management operations for execution based on a global prioritization across the distributed database system.

In some embodiments, the partition manager 470 (or another component of storage node instance 360) may be configured to provide metadata about the storage node and/or its storage devices/volumes, recommendations of particular storage devices/volumes on which to place tables, partitions, and replicas, confirmation of resource reservations, or other information to the auto admin instance 350 that provides administrative functionality for the storage node instance 360. For example, in some embodiments, the partition manager 470 (or another component of storage node instance 360) may be configured to determine whether it can host a particular table, partition, or replica (e.g., based on the available storage and/or throughput capacity of the storage node instance), and/or to identify the particular storage devices/volumes on which a particular table, partition, or replica can be placed.

As described in more detail herein, backup and/or restore operations for database tables may be initiated through requests received by front end 340, in some embodiments. In other embodiments, backup and/or restore operations for database tables may be initiated through an admin console 465 of an auto admin instance 350. In either case, in response to such a request, an auto admin instance 350 may be configured to invoke an external workflow manager process to carry out the backup and restore operations (e.g., to coordinate, control, and monitor progress of these operations).

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in various embodiments, the components illustrated in FIGS. 4A-4C may be implemented directly within computer hardware, as instructions directly or indirectly executable by computer hardware (e.g., a microprocessor or computer system), or as a combination of these techniques. For example, these components may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, control plane APIs supported by the service may be used to initiate and/or control backup and/or restore operations for various tables and the partitions thereof. For example, the service may support methods that initiate an asynchronous process to back up a specified table (e.g., a CreateBackup API), that initiate an asynchronous process to restore a table from a specified backup (e.g., a RestoreBackup API), that list the available backups (e.g., a ListBackups API), that return backup-related information about a specified backup (e.g. a DescribeBackup API), or that delete a specified backup (e.g., a DeleteBackup API).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

Various techniques that may be implemented by a Web server (or various components thereof) are described in more detail below, according to different embodiments. In general, any or all of the techniques described herein for managing the processing of service requests on behalf of clients and/or the management of tables, partitions, and replicas (including backup and/or restore operations) may be performed by and/or implemented in a component that is a component of a Web server. While several examples described herein are directed to systems that provide services over the Internet, in other embodiments, these techniques may be performed by and/or implemented by various components of another type of system that provides services to clients, and that is configured to receive, accept, and/or service requests on behalf of those clients.

In some embodiments, the distributed data storage systems described herein may be configured to back up table data (e.g., the data of various partitions of database tables) and/or metadata about tables, partitions, and/or backups to a remote key-value storage system. In some embodiments, the remote key-value storage system may be dedicated for backup storage, while in other embodiments the remote key-value storage system may provide general-purpose storage for a variety of clients and/or client applications. In various embodiments, a distributed data storage system, a general-purpose computing system, or a computing system that provides another type of service that stores data locally in-memory (e.g., ephemerally) may write one or more copies of the partition data to a remote key-value storage system that employs disk, solid-state storage devices, or another type of persistent storage media in order to provide durability. The distributed data storage systems described herein may be able to restore backed up partition data from the backup system, which may include a workflow manager component accessing and importing each backed up partition in the remote system using a unique identifier of the backed up partition as a key.

In some embodiments, each partition that is backed up in the remote key-value storage system may be stored as an individual (or separable) object in a remote backup storage system that provides durable key-value storage, and the keys for each partition that is backed up (e.g., their unique identifiers) may be stored in metadata associated with the table, the partition and/or the backup. In some embodiments, the distributed data storage systems described herein may provide high durability storage to its clients/subscribers by backing up database tables (on a partition basis) in a remote key-value durable storage system.

Figure 5:
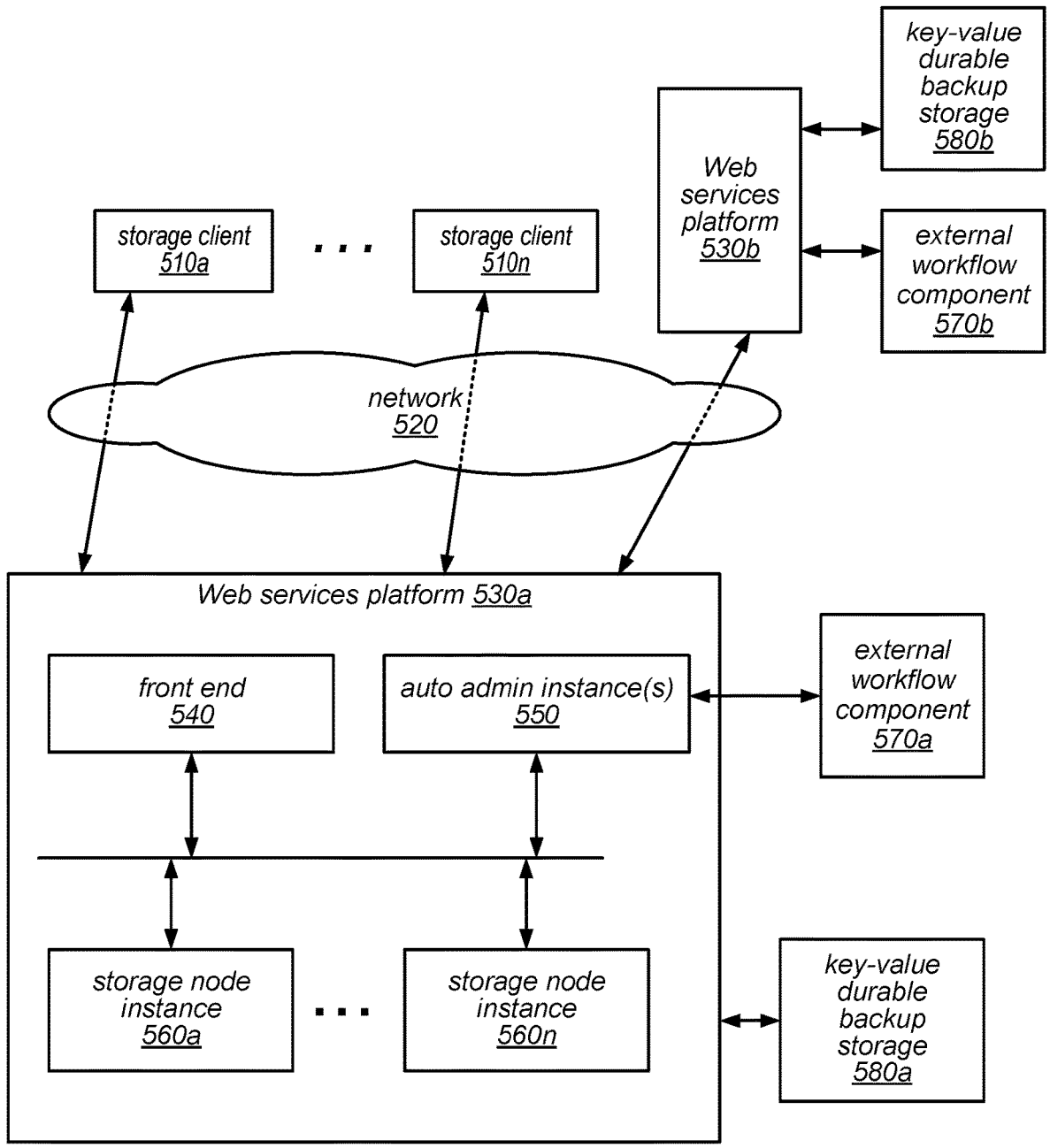
FIG. 5 is a block diagram illustrating various components of a Web services platform that provides a scalable database service, according to some embodiments.

FIG. 5 is a block diagram illustrating various components of a Web services platform, which may provide a scalable database service, such as that described herein. In various embodiments, some of the components illustrated in FIG. 5 may not be visible to the clients of the Web services platform (or to the scalable database service). As illustrated in this example, storage clients 510a-510n may access Web services platform 530a (e.g., front end 540 and/or a console of an auto admin instance 550) via network 520 (e.g., these components may be network-addressable and accessible to the storage clients 510a-510n). In this example, external workflow component 570a may include a workflow manager (e.g., a state machine) that controls, coordinates, and monitors the progress of various backup and restore operations, such as those described herein.

In this example, key-value durable backup storage 580a (which may be located in the same region as Web services platform 530a) and/or key-value durable backup storage 580b (which may be located in a different region, i.e. the same region as Web services platform 530b) may be employed by Web services platform 530 when performing various backup and restore operations, such as those described herein. In other words, in some embodiments, when backing up a table whose partitions are stored on any of storage node instances 560a-560n, the scalable database service provided by Web services platform 530a may be configured to employ external workflow component 570a to control an operation to back up each of the partition to key-value durable backup storage 580a. Similarly, in response to a request to perform a cross-region copy backup operation, the scalable database service provided by Web services platform 530a may be configured to employ external workflow component 570b to control an operation to copy a backup from key-value durable backup storage 580a to key-value durable backup storage 580b, with or without assistance from Web services platform 530b.

For example, for a cross-region copy backup, most of the work to control, coordinate, and monitor the progress of the cross-region copy backup operation is performed by the Web services platform and/or workflow manager in the source region (e.g., by Web services platform 530a and/or workflow manager 570a) However, the Web services platform in the source region (e.g., Web services platform 530a) may communicate with a Web services platform in the destination region (e.g., Web services platform 530b) to initiate the creation of a backup in key-value durable backup storage 580b, which may include invoking a workflow manager (e.g., a state machine) of external workflow component 570b that controls, coordinates, and/or monitors the progress of the cross-region copy backup operation from the perspective of the destination region. However, key-value durable backup storage 580a and/or 580b may or may not be network-addressable and accessible to the storage clients 510a-510n, in different embodiments. For example, in some embodiments, Web services platform 530a and/or Web service platform 530b may perform these operations and/or other operations involving key-value durable backup storage 580a and/or 580b in a manner that is invisible to storage clients 510a-510n.

Figure 6:
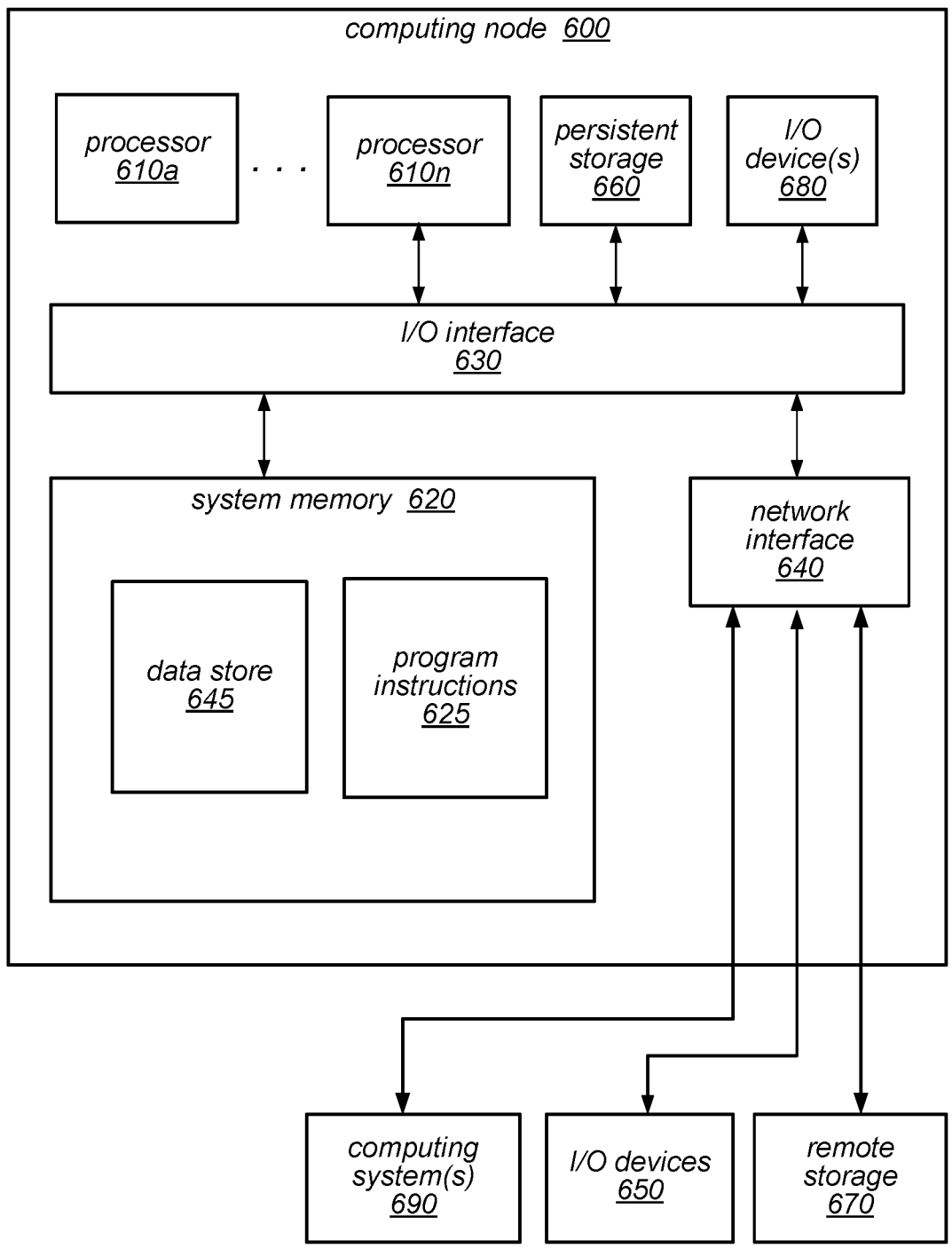
FIG. 6 is a block diagram illustrating a computing node that implements one or more of the techniques described herein, according to various embodiments.

FIG. 6 is a block diagram illustrating a computing node configured to implement at least a portion of a scalable, distributed data storage systems and/or a corresponding key-value durable backup storage system (or other remote storage system), according to various embodiments. For example, computing node 600 may represent a computing node that implements one or more of the techniques described herein for creating replicas, backing up database tables, verifying database tables to be backed up, and/or restoring database tables from a backup, according to various embodiments. In various embodiments, computing node 600 may be configured to implement any or all of the components of a system that implements a scalable, distributed data storage system and a corresponding key-value durable backup storage system, or multiple computing nodes similar to or different from computing node 600 may collectively provide this functionality. For example, in various embodiments, one or more computing nodes 600 may implement any number of storage service clients 310, a front end 340, any number of auto admin instances 350, any number of storage devices (such as storage node instances 360), and/or any other components of a Web services platform 330, an auto admin cluster, or external resources that interact with Web services platform 330 (such as external workflow component 370). Any number of those storage node instances 360 may each host one or more replicas of various data partitions and/or metadata associated therewith. For example, any given storage node instance 360 may host a replica acting as master replica for its replica group and/or a replica acting as a slave replica in its replica group.

In various embodiments, any or all of the techniques described herein for performing partitioning, repartitioning (e.g., through partition splitting and/or partition moving), replication, placement (of tables, partitions, or replicas), table/partition backup, backup object verification, and table/partition restoration, and/or otherwise managing partition data may be performed by one or more components of the storage node instances 360 that host a master replica and/or a slave replica, such as partition manager 470 and replication and failover component 475 illustrated in FIG. 4C or by one or more components of an auto admin instance 350 (e.g., partition management scheduler 420, which may include a sweeper component/module and/or an event scheduler component/module).

Similarly, one or more computing nodes 600 may implement a key-value durable backup storage system (or an interface or other component thereof), in different embodiments. Computing node 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 600, all of the computing nodes 600 may include the same or similar hardware components, software components, and functionality, while in other embodiments the computing nodes 600 comprising a computing system configured to implement the functionality described herein may include a wide variety of hardware components, software components, and functionality. In some embodiments, multiple computing nodes 600 that collectively implement a data storage service or a remote storage system may be components of a larger shared resource system or grid computing system. It is noted that different elements of the system described herein may be implemented by different computing nodes 600. For example, a computer system that supports the functionality described herein for performing backup and restore operations may be implemented on the same computing nodes 600 on which clients (through which a customer or subscriber may access the system) execute, or on one or more other computing nodes 600, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 600.

In the illustrated embodiment, computing node 600 includes one or more processors 610 (any of which may include multiple cores, which may be single or multi-threaded) coupled to a system memory 620 via an input/output (I/O) interface 630. Computing node 600 further includes a network interface 640 coupled to I/O interface 630. In various embodiments, computing node 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. Similarly, in a distributed computing system such as one that collectively implements a scalable database service or a remote storage service in which tables are backed up, each of the computing nodes may implement the same ISA, or individual computing nodes and/or replica groups of nodes may implement different ISAs.

The computing node 600 also includes one or more network communication devices (e.g., network interface 640) for communicating with other systems and/or components over a communications network (e.g. Internet, LAN, etc.). For example, a client application executing on computing node 600 may use network interface 640 to communicate with a server application executing on a single server or on a cluster of servers that implement a distributed system. In another example, an instance of a server application executing on computing node 600 may use network interface 640 to communicate with other instances of the server application that may be implemented on other computer systems.

In the illustrated embodiment, computing node 600 also includes one or more persistent storage devices 660 and/or one or more I/O devices 680. In various embodiments, persistent storage devices 660 may correspond to disk drives, tape drives, solid state memory, other mass storage devices, or any other persistent storage device. Computing node 600 (or a distributed application or operating system operating thereon) may store instructions and/or data in persistent storage devices 660, as desired, and may retrieve the stored instruction and/or data as needed.

Computing node 600 includes one or more system memories 620 that are configured to store instructions and/or data (shown as program instructions 625 and data store 645, respectively) that are accessible by processor(s) 610. In various embodiments, system memories 620 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 620 may contain program instructions 625 that are executable by processor(s) 610 to implement the methods and techniques described herein.

In the illustrated embodiment, program instructions and data implementing desired functions, methods or techniques (such as functionality for backing up tables, verifying backup objects and/or restoring tables from backup using any or all of the mechanisms described herein), are shown stored within system memory 620 as program instructions 625. For example, program instruction 625 may include program instructions that when executed on processor(s) 610 implement any or all of a storage service client 310, a front end 340 (which may include a user interface), an auto admin instance 350, a storage node instance 360, an admin console 465, a partition management partition management scheduler 420, a request router, a staging host, one or more metadata tables, an external workflow component 370, and/or any other components, modules, or sub-modules of a system that provides the data storage system and services described herein. Program instructions 625 may also include program instructions configured to implement additional functionality of a system that implements a data storage service not described herein. In some embodiments, program instructions 625 may include program instructions configured to implement functionality of a key-value durable backup storage system or another type of remote storage system suitable for backing up tables and/or partitions thereof. In some embodiments, program instructions 625 may implement multiple separate clients, server nodes, and/or other components.

It is noted that in some embodiments, program instructions 625 may include instructions and data implementing desired functions that are not directly executable by processor(s) 610 but are represented or encoded in an abstract form that is translatable to instructions that are directly executable by processor(s) 610. For example, program instructions 625 may include instructions specified in an ISA that may be emulated by processor 610, or by other program instructions 625 executable on processor(s) 610. Alternatively, program instructions 625 may include instructions, procedures or statements implemented in an abstract programming language that may be compiled or interpreted in the course of execution. As non-limiting examples, program instructions 625 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 625 may include instructions executable to implement an operating system (not shown), which may be any of various operating systems, such as UNIX, LINUX, Solaris™, MacOS™, Windows™, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In other embodiments, program instructions and/or data as described herein for implementing a data storage service that employs the techniques described above may be received, sent or stored upon different types of computer-readable media or on similar media separate from system memory 620 or computing node 600. Program instructions and data stored on a computer-readable storage medium may be transmitted to a computing node 600 for execution by a processor 610 by transmission media or signals such as electrical, electromagnetic, or digital signals, which may be conveyed via a communication medium such as a network and/or a wireless link, such as may be implemented via network interface 640.

In some embodiments, system memory 620 may include data store 645, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 645 or in another portion of system memory 620 on one or more nodes, in persistent storage 660, and/or in remote storage 670, in various embodiments. In some embodiments, and at various times, system memory 620 (e.g., data store 645 within system memory 620), persistent storage 660, and/or remote storage 670 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 670 may be a key-value durable storage system in which tables (and/or partitions thereof) are backed up and from which they are restored, as described herein.

Data store 645 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 630 may be configured to coordinate I/O traffic between processor(s) 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computing node 600 and other devices attached to a network, such as other computer systems 690 (which may implement one or more server nodes and/or clients of a scalable, distributed data storage system and/or a remote key-value durable storage system), for example. In addition, network interface 640 may be configured to allow communication between computing node 600 and various I/O devices 650 and/or remote storage 670), or between other nodes in a system providing shared computing services. In general, network interface 640 may be configured to allow data to be exchanged between computing node 600 and any of a variety of communication devices, external storage devices, input/output devices and/ or other computing devices, in different embodiments.

Input/output devices 650 may, in some embodiments, include one or more display terminals, keyboards, keypads, touchpads, scanning devices, voice or optical recognition devices, or any other devices suitable for entering or retrieving data by one or more computing nodes 600. Multiple input/output devices 650 may be present in computing node 600 or may be distributed on various nodes of a distributed system that includes computing node 600. In some embodiments, similar input/output devices may be separate from computing node 600 and may interact with one or more nodes of a distributed system that includes computing node 600 through a wired or wireless connection, such as over network interface 640. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computing node 600 may include more, fewer, or different components than those illustrated in FIG. 6 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 600, and if so, may interact with various input/output devices 650 to provide and/or receive information. Alternatively, other clients/users may use client computing systems to access the system, such as remotely via network interface 640 (e.g., via the Internet and/or the World Wide Web). In addition, some or all of the computing nodes of a system providing the service may provide various feedback or other general types of information to clients/users (e.g., in response to user requests) via one or more input/output devices 650.

It is noted that any of the distributed system embodiments described herein, or any of their components, may be implemented as one or more web services. For example, a front end or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 600 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 600 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 600 may be transmitted to computing node 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

What is claimed is:

1. A system, comprising:
    a plurality of nodes of a distributed storage system, wherein at least some of the nodes store database partitions of a database,
    wherein at least one of the nodes is configured to:
        send a first copy of one of the database partitions to a recipient node, wherein the recipient node is a node of the distributed storage system or a node of another storage system;
        validate, responsive to sending the first copy, a second copy of the database partition, wherein the second copy is stored in a data storage of the at least one node; and
        based on a determination that the second copy of the database partition stored in the data storage cannot be validated, cause the first copy of the database partition to be invalidated at the recipient node.

2. The system of claim 1, wherein the at least one node is further configured to:
    export a database partition export file for the one of the database partitions, wherein the distributed storage system is configured to receive and service requests to access the one of the database partitions for reading or writing subsequent to initiation of the export and prior to completion of the export; and
    store the database partition export file in the data storage of the at least one node as the second copy of the database partition,
    wherein the first copy of the database partition sent to the recipient node comprises another copy of the database partition export file.

3. The system of claim 2, wherein the database partition export file is stored on a utility storage device of the at least one node, wherein the utility storage device is a separate storage device from one or more other storage devices of the at least node configured to host one or more database partitions.

4. The system of claim 3, wherein the first and second copy of the database partition each comprise one or more database files and one or more metadata files for the database partition, wherein the at least one node is further configured to:
    generate a checksum for the one or more database files and generate a checksum for the one or more metadata files; and
    send the checksum for the one or more database files and the checksum for the one or more metadata files to the recipient node with the first copy of the database partition.

5. The system of claim 4, further comprising the recipient node, wherein the recipient node is configured to:
    verify data integrity of the one or more database files and the one or more metadata files of the first copy of the database partition based on the checksum for the one or more database files and the checksum for the one or more metadata files.

6. The system of claim 5, wherein the recipient node is further configured to:
    responsive to verification of the one or more database files and the one or more metadata files, store the first copy of the database partition to a storage device of the recipient node,
    wherein a streaming checksum is performed on the first copy of the database partition while being stored to the storage device of the recipient node.

7. A method comprising:
    validating a first copy of a data partition stored in a first storage after initiating a store of a second copy of the data partition that is stored to a second storage; and
    based on a determination that the first copy of the data partition stored in the first storage cannot be validated, invalidating the second copy of the data partition stored to the second storage.

8. The method of claim 7, further comprising:
    exporting a data partition file for a database, while continuing to receive and service requests to access the data partition for reading or writing subsequent to initiation of the export and prior to completion of the export; and
    storing the exported data partition file as the first copy of the data partition.

9. The method of claim 8, further comprising:
    generating a checksum for one or more database files included in the exported data partition file; and
    generating a checksum for one or more metadata files included in the exported data partition file.

10. The method of claim 9, further comprising:
    sending the second copy of the data partition file, the generated checksum for the one or more database files, and the generated checksum for the one or more metadata files to a recipient node comprising the second storage,
    wherein said validating the first copy of the data partition is performed at a source node comprising the first storage; and
    wherein said invalidating the second copy of the data partition is performed, responsive to the source node failing to validate the first copy of the data partition.

11. The method of claim 10, further comprising:
    verifying one or more database files and one or more metadata files included in the first copy of the data partition based on the generated checksum for the one or more database files and the generated checksum for the one or more metadata files; and in response to verification of the one or more database files and the one or more metadata files, making the second copy of the data partition available for use by a client.

12. The method of claim 7, further comprising:

generating, based on the second copy, a replica of the data partition at a recipient node comprising the second storage.

13. The method of claim 7, further comprising:

sending the second copy of the data partition to a backup storage system, wherein the second storage is a storage of the backup storage system;

verifying, at the backup storage system, one or more database files and one or more metadata files included in the second copy of the data partition based on a checksum for the one or more database files and a checksum for the one or more metadata files included in the second copy; and in response to verification of the one or more database files and the one or more metadata files, making the second copy of the data partition available for use by a client.

14. The method of claim 7, further comprising:

installing a database using one or more database files and one or more metadata files included in the first copy of the data partition to validate the first copy of the data partition, wherein the first copy of the data partition cannot be validated if the database cannot be installed.

15. The method of claim 14, further comprising:

verifying items included the database subsequent to installing the database, wherein the first copy of the data partition cannot be validated if the items cannot be verified.

16. A non-transitory, computer-readable storage medium, storing program instructions that when executed by one or more processors, cause the one or more processors to:

validate a first copy of a data partition stored in a first storage after initiating a store of a second copy of the data partition that is stored to a second storage; and based on a determination that the first copy of the data partition stored in the first storage cannot be validated, cause invalidation of the second copy of the data partition stored to the second storage.

17. The non-transitory, computer-readable storage medium of claim 16, wherein the program instructions further cause the one or more processors to:

export a data partition export file for the data partition of a database, wherein the database continues to receive and service requests to access the data partition for reading or writing subsequent to initiation of the export and prior to completion of the export, wherein the first copy of the data partition comprises the data partition export file and the second copy of the data partition comprises a copy of the data partition export file.

18. The non-transitory, computer-readable storage medium of claim 17, wherein the program instructions further cause the one or more processors to:

generate a checksum for each of one or more database files included in the data partition export file; and generate a checksum for each of one or more metadata files included in the data partition export file.

19. The non-transitory, computer-readable storage medium of claim 18, wherein the program instructions further cause the one or more processors to:

cause the generated checksums for the one or more database files, the generated checksums for the one or more metadata files, the one or more database files and the one or more metadata files to be sent to the second storage.

20. The non-transitory, computer-readable storage medium of claim 16, wherein the program instructions further cause the one or more processors to:

install the database partition using one or more database files and one or more metadata files included in the first copy of the data partition to validate the first copy of the data partition, wherein the first copy of the data partition cannot be validated if the database cannot be installed.

* * * * *